R. M. Livingston,
Cheese Vat.
No. 89,157.  Patented Apr. 20, 1869.
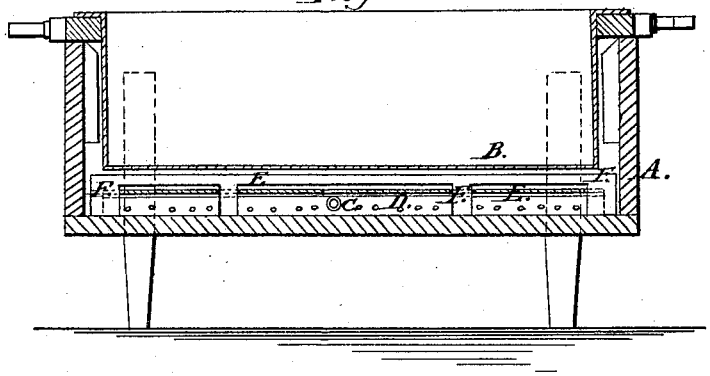
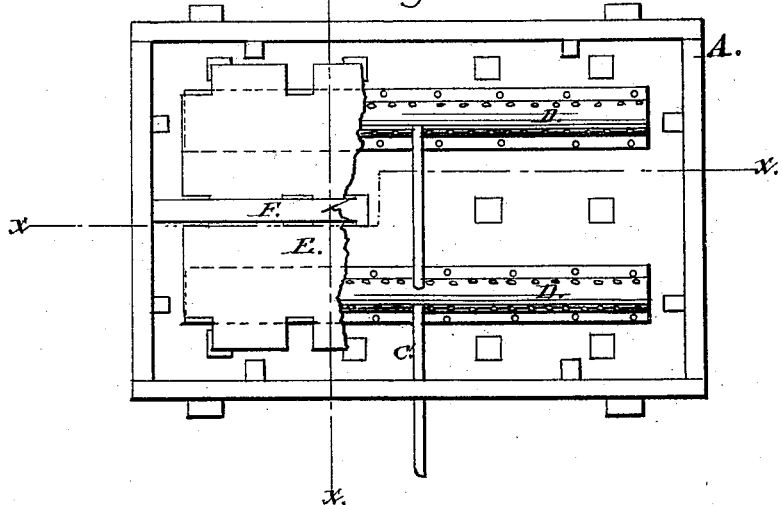
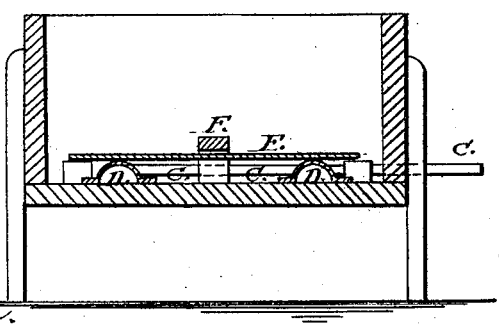
Witnesses:
Wm A. Morgan.
G. C. Cotton.
Inventor:
R. M. Livingston
per Munn & Co.
attorneys.

RICHARD M. LIVINGSTON, OF MANTENO, ILLINOIS.

Letters Patent No. 89,157, dated April 20, 1869.

IMPROVEMENT IN CHEESE-VATS.

The Schedule referred to in these Letters Patent and making part of the same.

*To all whom it may concern:*

Be it known that I, RICHARD M. LIVINGSTON, of Manteno, in the county of Kankakee, and State of Illinois, have invented a new and useful Improvement in Cheese-Vats; and I do hereby declare that the following is a full, clear, and exact description thereof, which will enable others skilled in the art to make and use the same, reference being had to the accompanying drawings, forming a part of this specification.

The nature of this invention relates to improvements in cheese-vats, the object of which is to provide a means for more equally diffusing the heat which is used for facilitating the preparation of the curd, and it consists in the arrangement of parts.

Figure 1 represents a longitudinal sectional elevation;

Figure 2 represents a plan view of the heating-vat, with a part broken away; and Figure 3 represents a transverse section on the line *x x* of fig. 2.

Similar letters of reference indicate corresponding parts.

A represents the heating-vat, wherein the vat B, for containing the milk, is set, as represented in fig. 1.

It is provided with a steam or hot-water supply-pipe, C, which communicates with two, or any other suitable number of enlarged perforated distributing-pipes, D, which may be so arranged upon the bottom of the heating-vat, as to produce the best effects in equally distributing the heat.

E represents a false bottom, of any suitable material, provided with perforations, and arranged upon suitable supports, rising up from the bottom of the vat A sufficiently to maintain it above the perforated pipes, which further assist the distribution of the heat.

F represents a support for the central portion of the milk-vat, and is arranged in the bottom of the vat A, as shown in fig. 1.

There may be any suitable number of such supports, according to the size and strength of the bottom of the vat B, the false bottom, A, being provided with openings for the legs of the said supports.

I am aware that the perforated false bottom, and the removable milk-vat, have heretofore been used in cheese-vats, and I therefore do not claim them; but

Having thus described my invention,

What I claim as new, and desire to secure by Letters Patent, is—

The described arrangement of the perforated pipes D, hot-water supply-pipe C, support F, for the milk-vat B, and the removable false bottom, having central perforations, for the passage of the supports F, as herein set forth, for the purpose specified.

The above specification of my invention, signed by me, this 25th day of May, 1868.

RICHARD M. LIVINGSTON.

Witnesses:
J. B. DEMARAIS,
ALFRED DESLAURIERS.